(12) United States Patent
Rashid et al.

(10) Patent No.: US 12,496,933 B2
(45) Date of Patent: Dec. 16, 2025

(54) SYSTEM AND METHOD FOR FUSION BASED WASTE HEAT ESTIMATION IN THERMAL SYSTEM MANAGEMENT FOR ELECTRIFIED VEHICLE

(71) Applicant: FCA US LLC, Auburn Hills, MI (US)

(72) Inventors: Muzamil Rashid, Auburn Hills, MI (US); Islam Benouaguef, Auburn Hills, MI (US); Mojtaba Kordestani, Windsor (CA); Bilge Kagan Donmez, Ismir (TR); Sina Shojaei, Auburn Hills, MI (US); Kamal Bouyoucef, Auburn Hills, MI (US); Feisel Weslati, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 84 days.

(21) Appl. No.: 18/619,472

(22) Filed: Mar. 28, 2024

(65) Prior Publication Data

US 2025/0303928 A1 Oct. 2, 2025

(51) Int. Cl.
*B60L 58/26* (2019.01)
*B60H 1/00* (2006.01)
(Continued)

(52) U.S. Cl.
CPC .......... *B60L 58/26* (2019.02); *B60H 1/00278* (2013.01); *B60H 1/0073* (2019.05); *B60H 1/00885* (2013.01); *B60K 1/02* (2013.01); *B60L 1/003* (2013.01); *B60H 2001/00307* (2013.01); *B60K 2001/005* (2013.01); *B60K 2001/006* (2013.01)

(58) Field of Classification Search
CPC ....... B60L 58/26; B60L 1/003; B60H 1/0073; B60H 1/00278; B60H 1/00885; B60H 2001/00307; B60K 1/02; B60K 2001/005; B60K 2001/006
See application file for complete search history.

(56) References Cited

U.S. PATENT DOCUMENTS

2015/0333379 A1* 11/2015 Janarthanam ......... H01M 10/48
429/61
2022/0134839 A1* 5/2022 He ..................... B60H 1/00485
165/203

FOREIGN PATENT DOCUMENTS

| CN | 108284725 A | * | 7/2018 | .............. B60L 58/26 |
| CN | 111403773 A | * | 7/2020 | ........ H01M 8/04029 |

* cited by examiner

*Primary Examiner* — Peter D Nolan
*Assistant Examiner* — Matthew Cobb
(74) *Attorney, Agent, or Firm* — Jeremy J. Klobucar

(57) ABSTRACT

A thermal management system for an electrified vehicle includes an electrified powertrain having at least one electric drive module (EDM), a battery system that powers the EDM, a heating ventilation and air conditioning (HVAC) system, a first, second and third coolant loop associated with the respective EDM, battery system and HVAC system, at least one valve that opens and closes to modify an amount of coolant being delivered between the first, second and third coolant loops, a first and second temperature sensor at opposite ends of the EDM, and a controller that receives the temperature signals; approximates an estimator probability distribution; determines an optimal estimate of heat absorbed by the coolant that maximizes the probability distribution; and communicates a signal to the at least one valve to modify an amount of coolant sent between the first coolant loop and at least one of the second and third coolant loops.

14 Claims, 8 Drawing Sheets

(51) Int. Cl.
  *B60K 1/02* (2006.01)
  *B60L 1/00* (2006.01)
  *B60K 1/00* (2006.01)

SYSTEM AND METHOD FOR FUSION BASED WASTE HEAT ESTIMATION IN THERMAL SYSTEM MANAGEMENT FOR ELECTRIFIED VEHICLE

FIELD

The present application relates generally to electric drive modules for electric vehicles and, more particularly, to a system and method for managing thermal systems in an electrified vehicle.

BACKGROUND

Electrified vehicles are configured with electric drive modules that deliver torque to drive wheels. Some electrified vehicles are configured with two electric drive modules, one for delivering torque to a front axle and one for delivering torque to a rear axle for operating the vehicle in all-wheel drive. Electric drive modules generate heat and therefore must be cooled (e.g., with coolant such as oil) to acceptable operating temperatures. In some instances it can be difficult to accurately quantify the amount of heat that is being absorbed by the coolant during such cooling. The amount of heat absorption is important as the heat produced by the heat sources (such as electric drive modules) can be transferred to other heat sinks within the electrified vehicle (such as, for example, the battery system and vehicle cabin). Accordingly, while such EDM configurations and associated thermal management systems work well for their intended purpose, there is a desire for improvement in the relevant art.

SUMMARY

In accordance with one example aspect of the disclosure, a thermal management system for an electrified vehicle includes an electrified powertrain having at least one electric drive module (EDM), a battery system that powers the EDM, a heating ventilation and air conditioning (HVAC) system, a first, second and third coolant loop associated with the respective EDM, battery system and HVAC system, at least one valve that opens and closes to modify an amount of coolant being delivered between the first, second and third coolant loops, a first and second temperature sensor at opposite ends of the EDM and a controller that receives the temperature signals; approximates an estimator probability distribution based on developed estimators; determines an optimal estimate of heat absorbed by the coolant that maximizes the probability distribution; and communicates a signal to the at least one valve to modify an amount of coolant sent between the first coolant loop and at least one of the second and third coolant loops.

In examples, the at least one EDM comprises a first EDM and a second EDM.

In addition to the foregoing, the first EDM is configured on a front axle of the electrified vehicle and the second electric drive module is configured on a rear axle of the electrified vehicle.

In addition to the foregoing, the controller is configured to approximate an estimator probability distribution based on developed estimators, wherein the developed estimators calculate a value using sensor fusion based on a mathematical model using the temperature signals of the second temperature sensors.

In addition to the foregoing, the controller is configured to approximate an estimator probability distribution by expanding a series of Gaussian distributions.

In examples, the series of Gaussian distributions include one of a Gaussian mixture models, Kernel density estimations, and Edgeworth series.

In other examples, the at least one valve comprises a first valve that selectively communicates coolant to at least one of the first heat sink and the second heat sink.

In accordance with one example aspect of the disclosure, a method of operating a thermal management system for an electrified vehicle is provided. The thermal management system includes an electrified powertrain comprising at least one electric drive module (EDM) having a first electric motor that generates a first drive torque; a battery system that powers the at least one EDM; a heating ventilation and air conditioning (HVAC) system; a first coolant loop associated with the at least one EDM; a second coolant loop associated with the battery system; a third coolant loop associated with the HVAC system; at least one valve that opens and closes to modify an amount of coolant being delivered between the first, second and third coolant loops; a first and a second temperature sensor that respectively measure temperature of coolant on opposite sides of the at least one EDM, the first and second temperature sensors providing temperature signals based on the measurements. The method includes: receiving, at a controller, the temperature signals; approximating, at the controller, an estimator probability distribution based on developed estimators; determining, at the controller, an optimal estimate of heat absorbed by the coolant that maximizes the probability distribution; communicating, at the controller, a signal to the at least one valve to modify an amount of coolant sent between the first coolant loop and at least one of the second and third coolant loops.

In examples, the at least one EDM comprises a first EDM and a second EDM.

In addition to the foregoing, the first EDM is configured on a front axle of the electrified vehicle and the second electric drive module is configured on a rear axle of the electrified vehicle.

In examples, the controller approximates an estimator probability distribution based on developed estimators, wherein the developed estimators calculate a value using sensor fusion based on a mathematical model using the temperature signals of the second temperature sensors.

In other examples, the controller approximates an estimator probability distribution by expanding a series of Gaussian distributions.

In examples, the series of Gaussian distributions include one of a Gaussian mixture models, Kernel density estimations, and Edgeworth series.

In additional examples, the at least one valve comprises a first valve that selectively communicates coolant to at least one of the first heat sink and the second heat sink, wherein communicating the signal to the at least one valve comprises communicating a first signal to the first valve resulting in a modified flow of coolant from the first coolant loop to at least one of the second and third coolant loops.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As noted above, electric drive modules generate heat and therefore must be cooled (e.g., with coolant such as oil) to acceptable operating temperatures. In some instances it can be difficult to accurately quantify the amount of waste heat that is being absorbed by the coolant from the EDM's. The amount of heat absorption is important as the heat produced by the heat sources (such as electric drive modules) can be transferred to other heat sinks within the electrified vehicle (such as, for example, the battery system and vehicle cabin) as part of a thermal management system in the electrified vehicle.

According to the principles of the present application, systems and methods are described for managing heat in an electrified vehicle. The exemplary electrified vehicle includes an electrified powertrain having an EDM assembly, a battery system and a cabin heating ventilation and air-conditioning (HVAC) system. In the example described herein, the EDM assembly comprises two EDM's or heat sources. The battery system and HVAC system comprises heat sinks. The system and methods herein determine how much heat is being produced at the heat sources. Once the amount of heat is determined, a determination is made whether it is more energy efficient to transfer the heat to one or more of the heat sinks.

Figure 1:
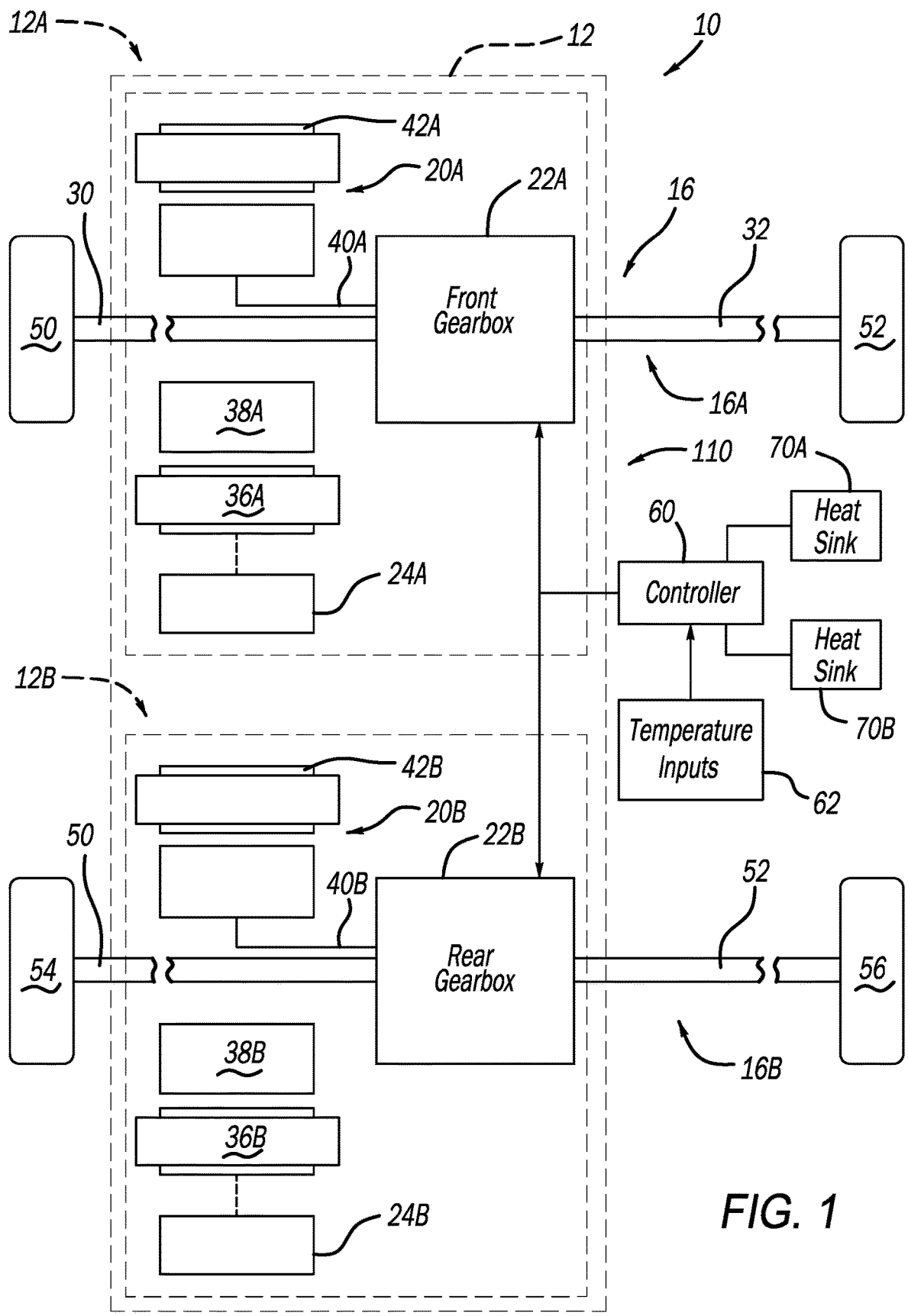
FIG. 1 is a schematic illustration of an example electric vehicle drivetrain having an electric drive module (EDM) assembly and exemplary first and second heat sinks, the EDM assembly including a front EDM and a rear EDM for use in an all-wheel drive electrified vehicle, the heat sinks corresponding to an exemplary battery system and a cabin HVAC system in accordance with the principles of the present application.

With initial reference to FIG. 1, an electrified vehicle 10 is partially shown in accordance with the principles of the present disclosure. In the example embodiment, the electrified vehicle 10 includes an electrified powertrain 12 configured to generate and transfer drive torque to a driveline 16 for vehicle propulsion. The electrified powertrain 12 generally includes a first EDM 12A and a second EDM 12B. For purposes of this discussion the first EDM 12A will be referred to as the front EDM 12A that provides drive torque to front drive axles 30, 32 and front drive wheels 50, 52. Similarly, the second EDM 12B will be referred to as the rear EDM 12B that provides drive torque to rear drive axles 50, 52 and rear drive wheels 54, 56. It will be appreciated that in other implementations, the first and second EDM's 12A and 12B may be swapped.

The first EDM 12A includes a first drive motor 20A, a first electric drive gearbox assembly 22A, and first power electronics including a power inverter module (PIM) 24A. The first electric motor 20A is selectively connectable via the PIM 24A to a high voltage battery system (represented by heat sink 70A) for powering the first electric motor 20A. The first gearbox assembly 22A is configured to transfer the generated drive torque to a front driveline 16A, including the front drive axles 30, 32 and front drive wheels 50, 52. In examples, the first gearbox assembly 22A can be configured as a single speed, fixed gearbox. In the example shown, the first electric motor 20A generally includes a first stator 36A, a first rotor 38A, and a first rotor output shaft 40A.

The second EDM 12B includes a second drive motor 20B, a second electric drive gearbox assembly 22B, and second power electronics including a power inverter module (PIM) 24B. The second electric motor 20B is selectively connectable via the PIM 24B to a high voltage battery system (represented by heat sink 70A) for powering the second electric motor 20B. The second gearbox assembly 22B is configured to transfer the generated drive torque to a rear driveline 16B, including the rear drive axles 50, 52 and rear drive wheels 54, 56. In the example shown, the second electric motor 20B generally includes a second stator 36B, a second rotor 38B, and a second rotor output shaft 40B.

The electrified vehicle 10 includes a thermal management system 110 that efficiently distributes heat between heat sources (such as EDM's 12A and 12B) and heat sinks 70A and 70B. In examples, a controller 60 receives inputs 62 (such as RPMs of the EDM's 12A, 12B and/or oil pump; or temperatures of various parameters including components or oil at the sump) as described in more detail below, determines an optimal estimate of the heat absorbed by the coolant based on estimators, and distributes heat throughout the heat sources and heat sinks.

Figure 2:
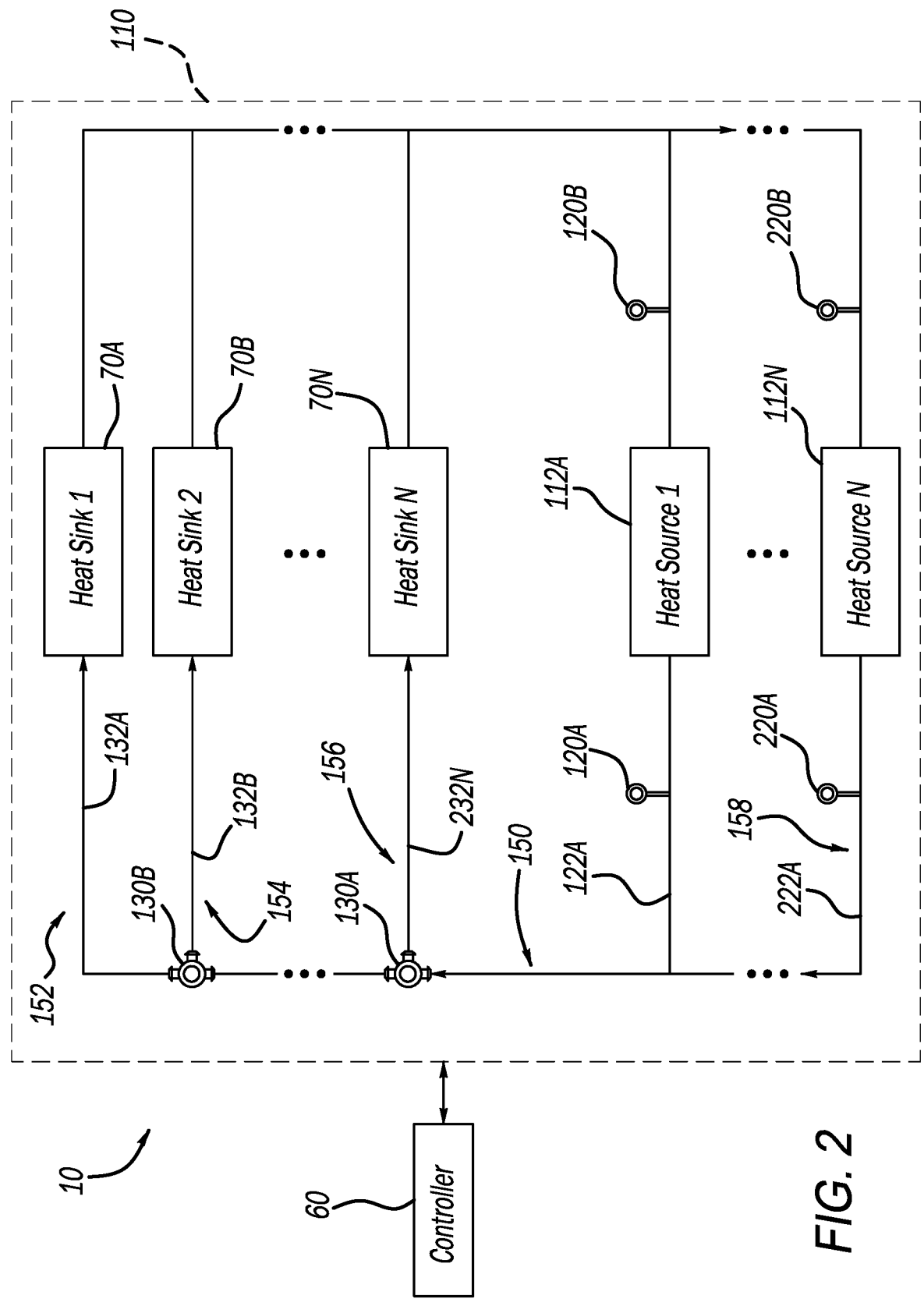
FIG. 2 is a schematic illustration of a thermal management system of electrified powertrain shown in FIG. 1, in accordance with the principles of the present application.

With additional reference now to FIG. 2, additional features of the thermal management system 110 will be described. In the example shown, the thermal management system 110 distributes heat between heat source 112A, heat source 112N, heat sink 70A, heat sink 70B and heat sink 70N. By way of example, the heat source 112A can be the EDM's 12A and 12B, the heat source 112N can be another heat source, the heat sink 70A can be a high voltage battery system and the heat sink 70B can be an HVAC system associated with the cabin of the electrified vehicle 10.

The thermal management system 110 distributes heat by controlling (e.g., with controller 60) the operating valves 130A and 130B as necessary to distribute coolant between a first coolant loop 150 associated with the heat source 112A (such as the collective EDM's 12A, 12B), a second coolant loop 152 associated with the heat sink 70A (such as the high voltage battery), a third coolant loop 154 associated with the heat sink 70B (such as the cabin HVAC system) and a fourth coolant loop 156 associated with heat sink 70N. It is appreciated that more or fewer heat sinks may be included. An additional coolant loop 158 can be associated with the heat source 112N. Again, additional heat sources may be incorporated. In some examples, one or more of the heat sinks 70A, 70B can include a supplemental heater that can introduce additional heat to the system.

Temperature sensors 120A and 120BA measure coolant temperature on opposite sides of the heat source 112A. Temperature sensors 220A and 220B measure coolant temperature on opposite sides of the heat source 112N. The controller 60 controls operation of valves 130A and 130B based on the temperate measurements and estimators as discussed herein according to the preferred thermal management decision.

Figure 3:
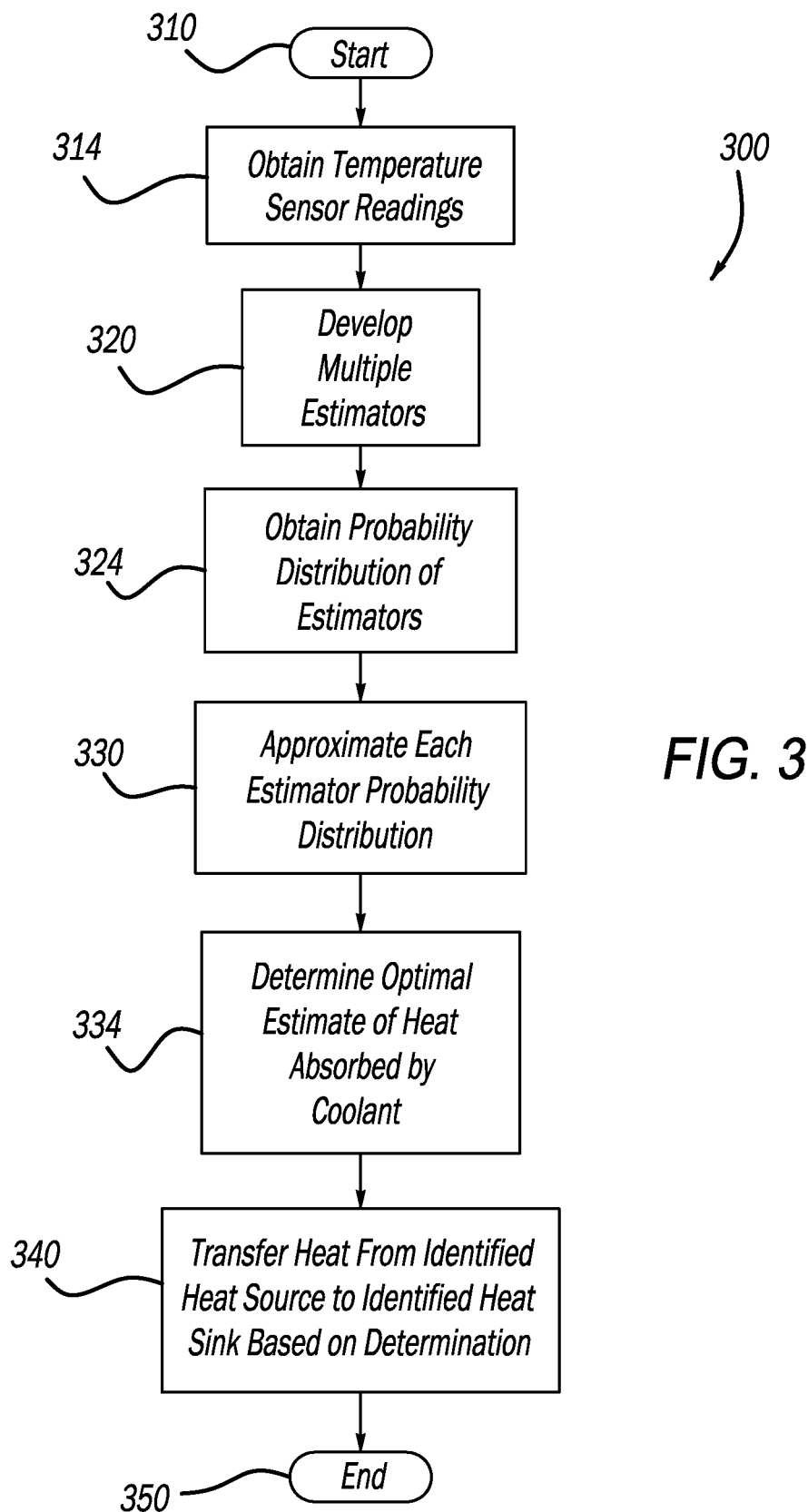
FIG. 3 is a logic flow diagram illustrating exemplary offline (coding development of the controller) and online (real time at the controller) steps for managing the thermal management system of FIG. 2 in accordance with the principles of the present application.
Figure 4:
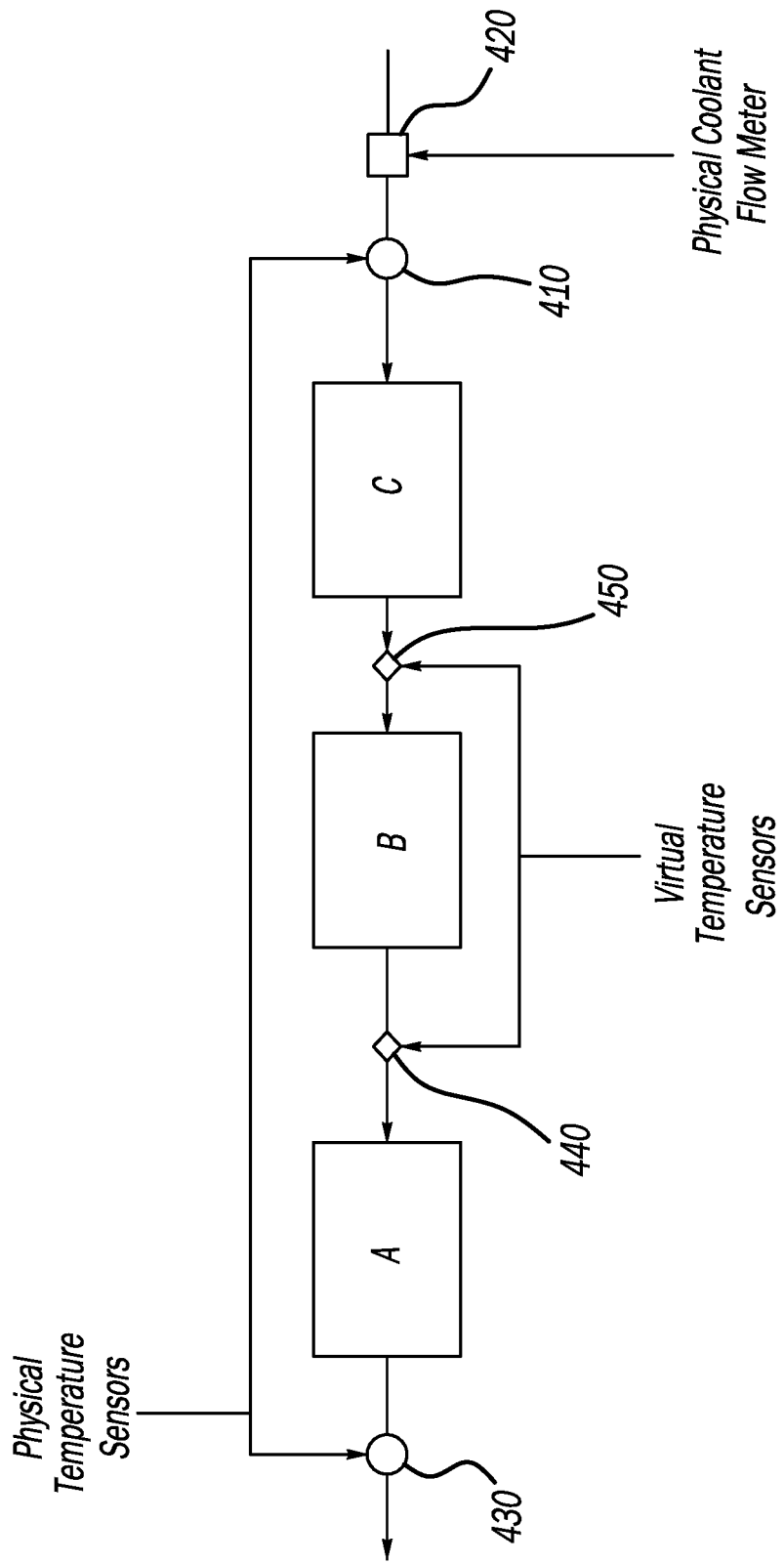
FIG. 4 is a sample schematic diagram of the thermal management system according to various features of the present application.

With reference now to FIG. 3, a method 300 illustrating exemplary (offline and online) steps for managing the thermal management system 110 of FIG. 2 in accordance with the principles of the present application will be described. An additional breakdown of the offline steps is described herein with respect to FIGS. 5-7. An additional breakdown of the online steps is described herein with respect to FIGS. 8-9.

The method starts at 310. At 314 control obtains temperature sensor readings from the temperature sensors 120A, 120B, 220A, 220B. At 320 control develops multiple estimators. The estimators can be developed in any manner such as manually developing equations by hand. Estimators calculate a value using sensor fusion, based on a mathematical model of a system, or part of a system, using physical sensor readings.

At 324, control obtains a probability distribution of the estimators. Using the probability distribution of the sensors (e.g., 120A, 120B, etc.) the probability distribution of each estimator is determined. For example, a probability distribution of a sensor can be +/−2 degrees Celsius around the correct value, so it can be assumed to be uniformly distributed around the correct valve by +/−2 units.

At 330, control approximates each estimator probability distribution. Each estimator probability distribution is approximated by expanding it in terms of a series of Gaussian distributions such as, but not limited to, Gaussian mixture models, Kernel density estimations, Edgeworth series, or other methods. The probability distribution of the estimator is calculated using the probability distribution of the sensors and the mathematical representation of the system or part of the system. In examples, this is done using analytical mathematics or computer simulations involving sampling of random numbers from a probability distribution. The probability distributions of the estimators are calculated offline. The probability distributions or expansions of the probability distributions, i.e., expansion of the probability distribution in terms of simpler probability distributions, are stored online in the controller 60.

At 334, control determines an optimal estimate of heat absorbed by the coolant. The optimal estimate of heat absorbed by the coolant is calculated to maximize the probability, P(Estimator 1 value=$x_1$ AND Estimator 2 value=$x_2$ AND .... AND Estimator 3 value=$x_3$|Heat Absorbed by coolant). The "Heat Absorbed by coolant" is being solved for by varying it such that the probability that each estimator gave is maximized. Such an approach can be referred to as a maximum likelihood estimation. Other methods can also be used such as: Ordered Weighted Averaging Operator, Decision Fusion, Fuzzy Integral, Dempster-Shafer, etc.

The temperature inputs of the sensors 120A, 120B are used by the controller 60 with the mathematical model of the system to calculate the different estimates. The estimates, along with the probability distribution of each estimator is used to determine an optimal estimate.

$$\max_x P(x_{k_1} \cap \ldots \cap x_{k_m}|x) = \max_x P(x_{k_1}|x)P(x_2|x) \ldots P(x_{k_m}|x)$$

Any other arbitration method can be used to calculate the optimal estimate, such as decision-fusion methods. A decision-fusion method can be, set the optimal estimate equal to one of the estimates depending upon the vehicle operation, thermal system operation, ambient environment condition, or any combination of all of them. Another example of fusion method that can be used is Ordered Weighted Averaging (OWA) Operator.

The sensor fusion can also be extended to use sensor fusion as a way of generating a virtual sensor. Virtual sensors can then be combined with physical sensors to get estimates of other quantities.

A physical temperature sensor 410 upstream of component C, along with physically measured coolant flow meter 420, and the heat generation from component C can be used to generate an estimate for coolant temperature upstream of B, a virtual sensor, using sensor fusion as described above. The physical temperature sensor 430 downstream of component A, along with physically measured coolant flow meter 420, and the heat generation from component A can be used to generate an estimate for coolant temperature downstream of B, a virtual sensor 440, using sensor fusion as described above. Using the virtual temperature sensor 440 downstream of B and the virtual temperature sensor 450 upstream of B, along with the physically measured coolant flow meter, can be used to estimate the heat generation/absorption of component B.

At 340 control transfers heat from the identified heat source (e.g., heat source 112A, 112N) to the identified heat sink (e.g., heat sink 70A, 70B, 70N) based on the determination. In other words, the waste heat generated by the heat source 112A (EDM's 112A, 112B) and absorbed by the coolant is compared to where the heating needs (or availability) are in the system 110. The heat can then be transferred from the heat source(s) 112A, 112N to the desired heat sink(s) 70A, 70B, 70N by operating the valves 130A, 130B to route the coolant as needed. Control ends at 350.

The strategy disclosed herein can also be used to estimate the waste heat absorbed by the coolant from other components such as the battery, however, the sensors available would be different than for the EDMs. The strategy can also be extended for use in rationalizing the readings from a sensor to determine if it is faulty. If the sensor value reading is too far away from the optimal estimate, that can be an indication that the sensor has suffered a fault. The optimal estimate from the sensor would be based on the values of other sensors, physics-based mathematical model, and probabilistic analysis. This can be terms as physics-model-based diagnostics as opposed to existing rule-based diagnostics that are based on operator knowledge. Instead of using any sensor value directly, the optimal estimated value of that sensor can be used which is expected to be more accurate, provided that the sensor is not faulty. This can allow for greater optimality of the operation of the thermal system. A more optimally operated thermal system would result in range benefits for EVs.

In general, the heat absorbed by coolant would be equivalent to the following equation 1:

$$\dot{Q}_{Absorb\_Coolant} = \dot{m}_{Coolant} * c_p * (T_{PECTOS} - T_{PPCTIS})$$

Where, $\dot{m}_{coolant}$, is the mass-flowrate of the coolant. It is the sum of the mass-flowrates of the coolant through both the front and the rear EDMs; $c_p$, is the specific heat capacity of the coolant; $T_{PECTOS}$, is the coolant temperature measured by temperature sensor PECTOS (temperature sensor 120A, FIG. 2); $T_{PPCTIS}$, is the coolant temperature measured by temperature sensor PPCTIS (temperature sensor 120B, FIG. 2).

The temperature sensors have an accuracy of ±2° C. Due to this, $T_{PECTOS}$, can read the same value as $T_{PPCTIS}$ although there has been a 2° C. temperature gain, hence providing an inaccurate value for the difference between $T_{PECTOS}$ and $T_{PPCTIS}$. In the above case, the estimate for the heat absorbed by the coolant would be 0 kW although in actuality there would have been a heat gain of X kW.

To determine a better estimate of the heat gain of coolant, the present disclosure provides a method that uses additional temperature sensors, the physics of the system in terms of equations relating the quantities of all these terms together, and probabilistic analysis of the equations.

The method uses multiple estimators for the heat gained by the coolant. An estimator is already given in equation 1. A physics-based equation for that estimates the heat absorbed by the coolant using sensor inputs is an estimator.

With continued reference to FIGS. 1-4 and additional reference to FIGS. 5-9 additional features of the instant method will be described showing exemplary steps taken offline to program the controller (FIGS. 5-7) and online executed by the controller (FIGS. 8-9) will be described. In general, the offline steps are used to code the controller 60. The online steps are steps executed by the controller 60 to open/close the valves, adjust the pump RPM's and adjust active heat sources. The heat absorbed by the coolant is used to operate valves (130A, 130B) and pumps to distribute heat from heat sources 112A, 112N to heat sinks 70A, 70B, 70N. As mentioned above, active heat sources can include electric heaters. If more waste heat is being generated from the EDM's 12A, 12B and battery (70A), control can rely less on active heat sources like electric heaters (70B).

Figure 5:
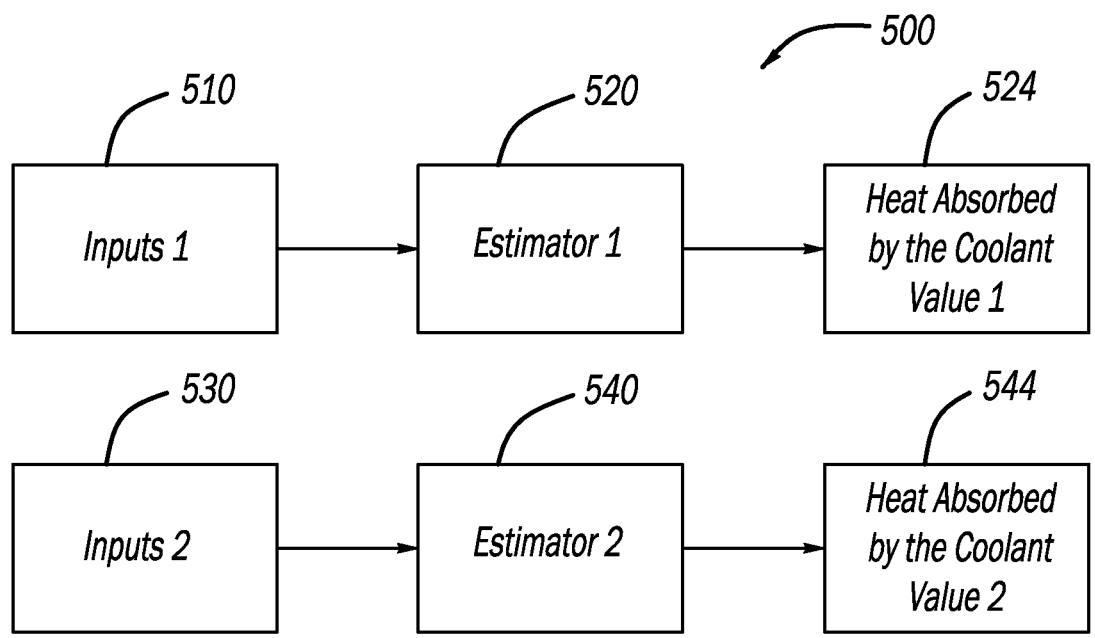
FIG. 5 is an exemplary logic flow of offline steps taken to develop physics equations according to examples of the present disclosure.

FIG. 5 is an exemplary logic flow of offline steps 500 taken to develop physics equations according to examples of the present disclosure. Inputs 1, generally identified at 510 are received by estimator 1, generally identified at 520. The inputs 510 can include various data inputs such as data indicative of coolant pump RPM and system temperatures. The estimator 1 520 outputs a heat absorbed by the coolant value 1 at 524. Inputs 2, generally identified at 530 are received by estimator 2, generally identified at 540. The inputs 530 can include various data inputs such as data indicative of EDM 12A torque and RPM, EDM 12B torque and RPM, temperatures of the stators 36A, 36B for the front and rear EDM's 12A, 12B, RPM's of the oil pump, and temperatures of the oil at the sump. The estimator 2 540 outputs a heat absorbed by the coolant value 2 at 544.

Figure 6:
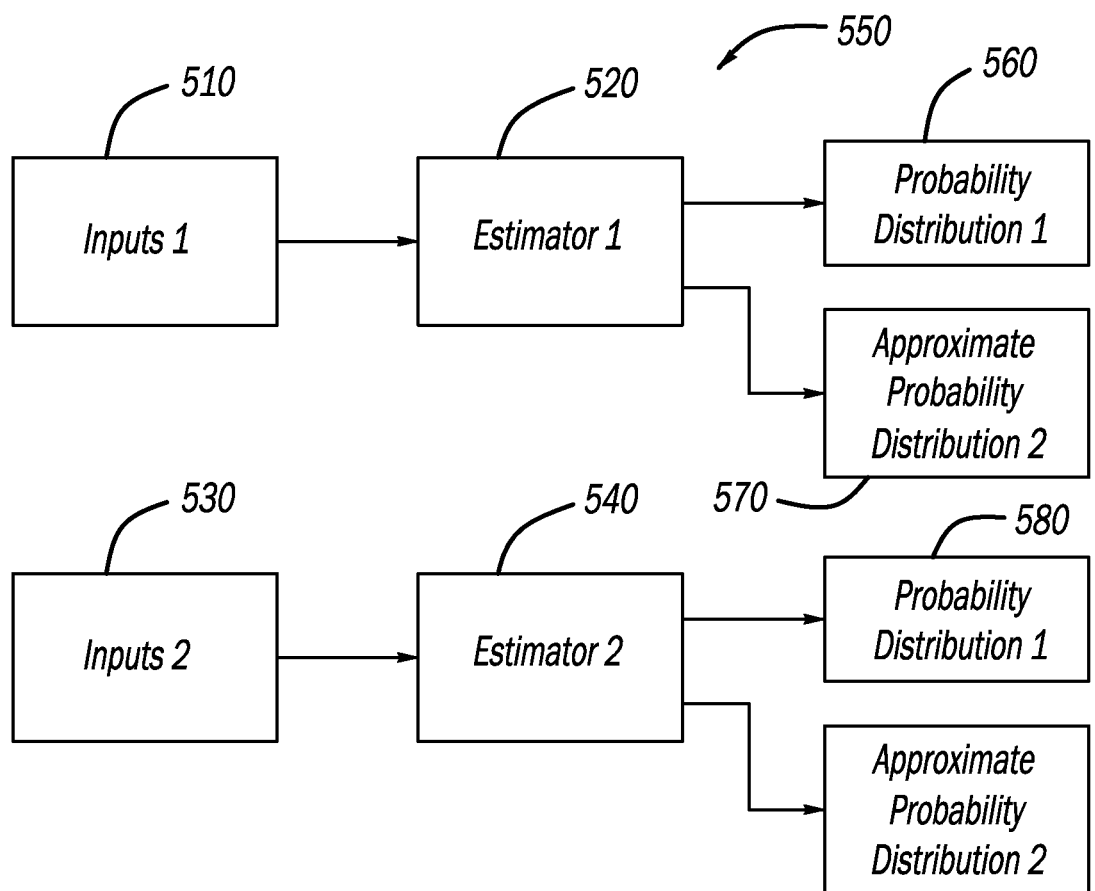
FIG. 6 is an exemplary logic flow of offline steps taken to determine probability distributions of the estimators of FIG. 5 according to examples of the present disclosure.

FIG. 6 is an exemplary logic flow of offline steps 550 taken to determine probability distributions of the estimators of FIG. 5 according to examples of the present disclosure. The inputs 510, 530 are fed into the estimators 520, 540. The estimator 520 determines a probability distribution 1 at 560 and an approximate probability distribution 1 at 570. The estimator 540 determines a probability distribution 2 at 580 and an approximate probability distribution 2 at 590. The approximate probability distributions 570 and 590 are easier to perform calculations and are stored in the controller 60.

Figure 7:
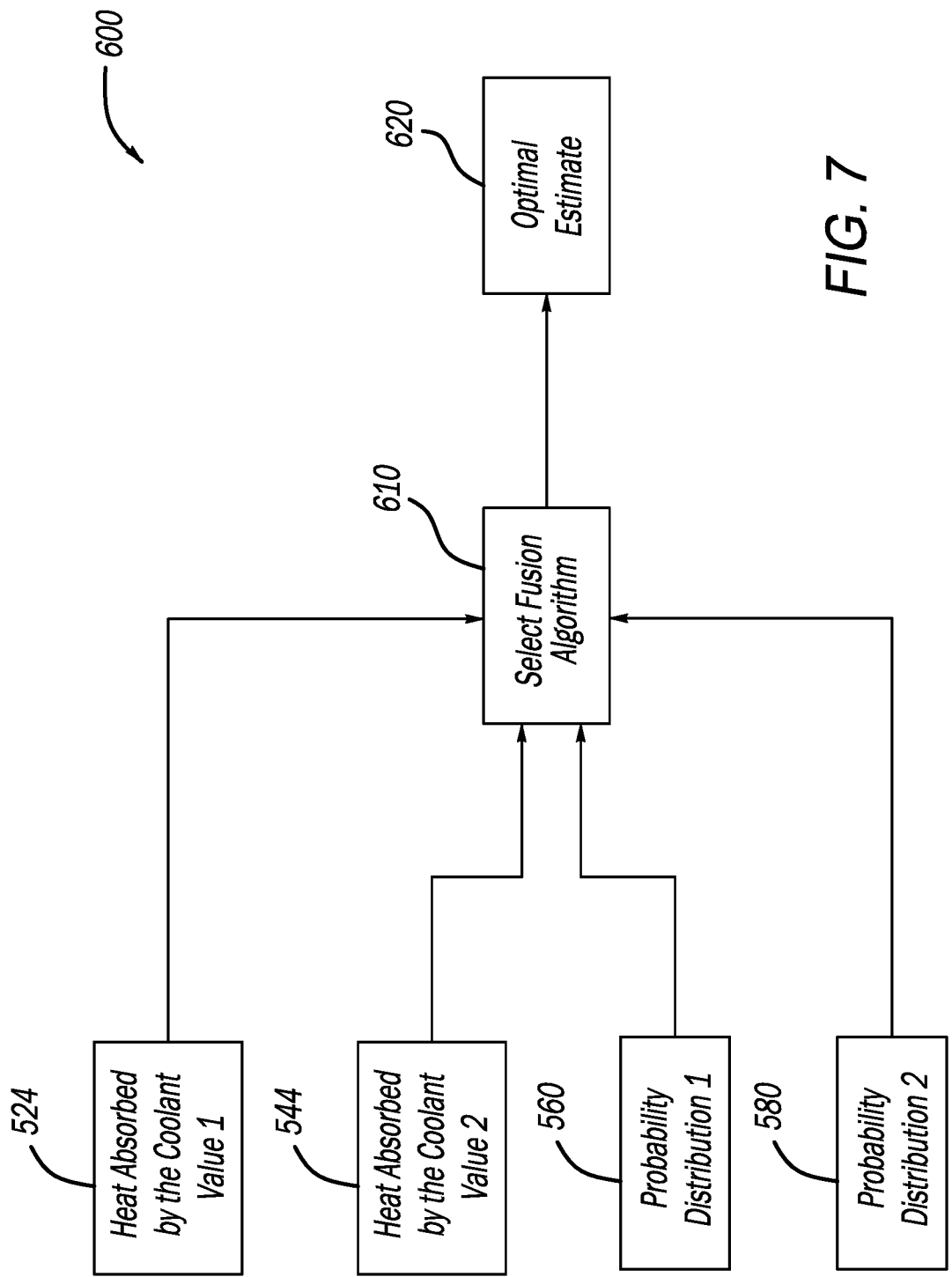
FIG. 7 is an exemplary method including offline steps for selecting a fusion method according to examples of the present disclosure.

FIG. 7 is an exemplary method 600 including offline steps for selecting a fusion method according to examples of the present disclosure. The heat absorbed by the coolant 524 and 544 and the probability distributions 560 and 580 are received at the select fusion algorithm 610. The select fusion algorithm 610 determines an optimal estimate 620.

Figure 8:
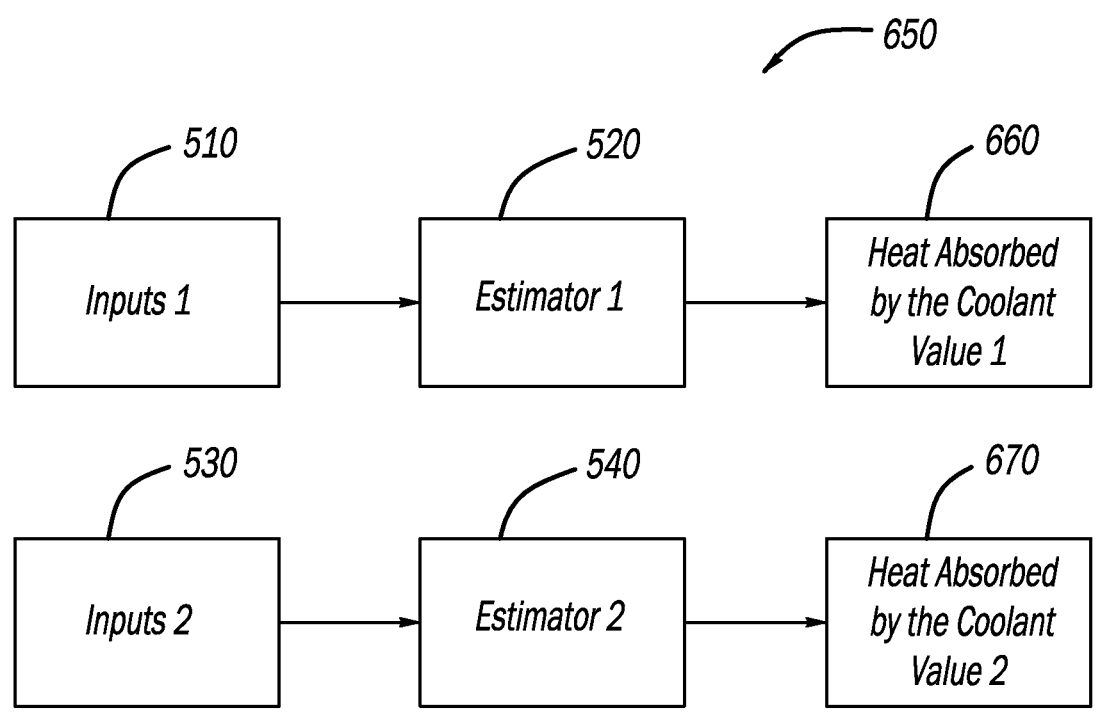
FIG. 8 is an exemplary logic flow of online steps taken to determine heat absorbed by the coolant according to examples of the present disclosure.

FIG. 8 is an exemplary logic flow of online steps 650 taken to determine heat absorbed by the coolant according to examples of the present disclosure. Inputs 510 are received by estimator 520. The estimator 520 outputs a heat absorbed by the coolant value at 660. Inputs 530 are received by estimator 540. The estimator 540 outputs a heat absorbed by the coolant value at 670.

Figure 9:
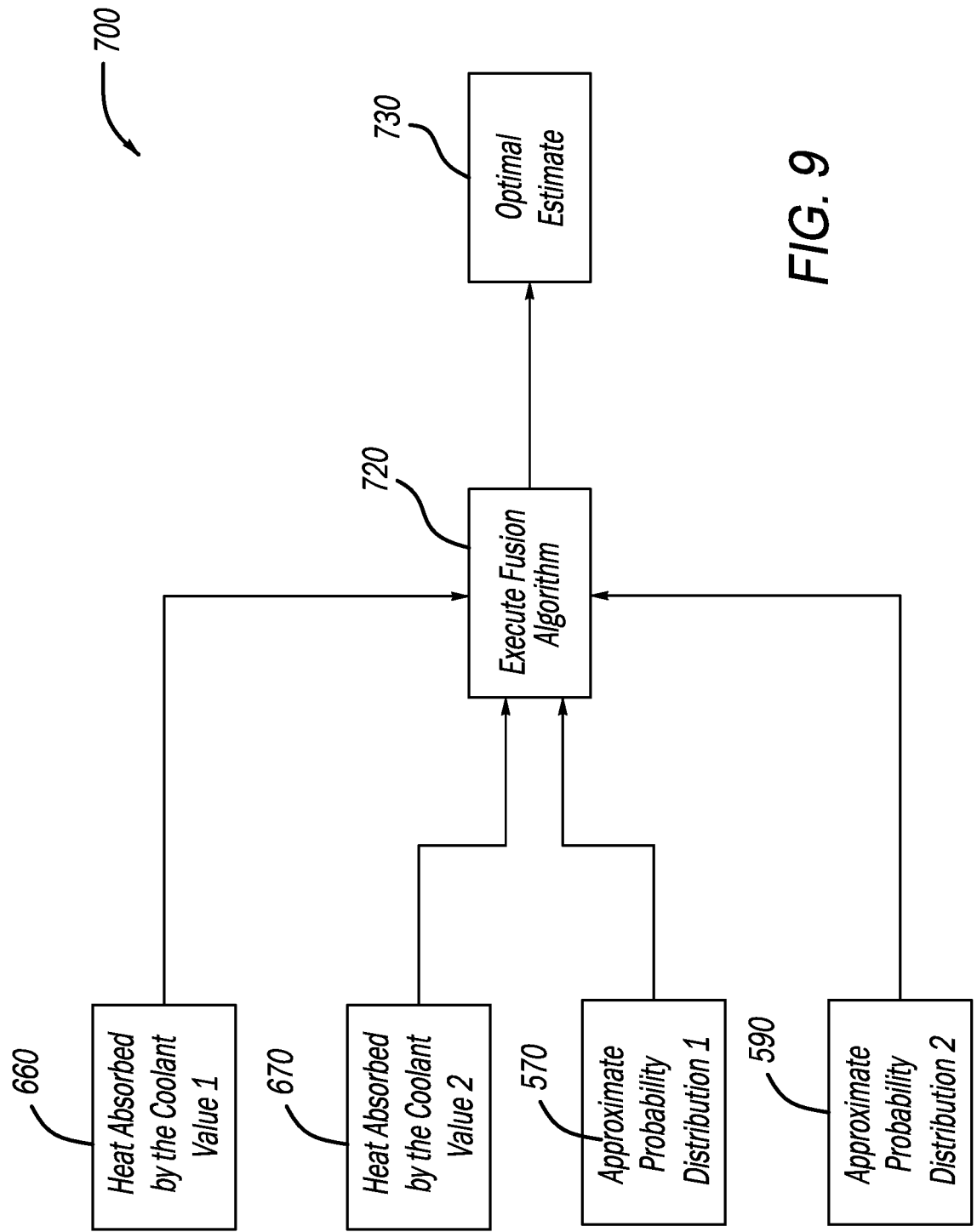
FIG. 9 is an exemplary method including online steps for executing the fusion algorithm according to examples of the present disclosure.

FIG. 9 is an exemplary method 700 including online steps for executing the fusion algorithm 720 according to examples of the present disclosure. In particular, the controller 60 executes the fusion algorithm 720 based on inputs 660, 670 indicative of the heat absorbed by the coolant values as well as the approximate probability distributions 570, 590. The fusion algorithm 720 outputs an optimal estimate 730.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A thermal management system for an electrified vehicle, the thermal management system comprising:
    an electrified powertrain comprising at least one electric drive module (EDM) having a first electric motor that generates a first drive torque;
    a battery system that powers the at least one EDM;
    a heating ventilation and air conditioning (HVAC) system;
    a first coolant loop associated with the at least one EDM;
    a second coolant loop associated with the battery system;
    a third coolant loop associated with the HVAC system;
    at least one valve that opens and closes to modify an amount of coolant being delivered between the first, second and third coolant loops;

a first and a second temperature sensor that respectively measure temperature of coolant on opposite sides of the at least one EDM, the first and second temperature sensors providing temperature signals based on the measurements; and a controller that is configured to:
receive the temperature signals;
approximate an estimator probability distribution based on developed estimators;
determine an optimal estimate of heat absorbed by the coolant that maximizes the probability distribution; and
communicate a signal to the at least one valve to modify an amount of coolant sent between the first coolant loop and at least one of the second and third coolant loops.

2. The thermal management system of claim 1, wherein the at least one EDM comprises a first EDM and a second EDM.

3. The thermal management system of claim 2, wherein the first EDM is configured on a front axle of the electrified vehicle and the second electric drive module is configured on a rear axle of the electrified vehicle.

4. The thermal management system of claim 1, wherein the controller is configured to approximate an estimator probability distribution based on developed estimators, wherein the developed estimators calculate a value using sensor fusion based on a mathematical model using the temperature signals of the second temperature sensors.

5. The thermal management system of claim 4, wherein the controller is configured to approximate an estimator probability distribution by expanding a series of Gaussian distributions.

6. The thermal management system of claim 5, wherein the series of Gaussian distributions include one of a Gaussian mixture models, Kernel density estimations, and Edgeworth series.

7. The thermal management system of claim 1, wherein the at least one valve comprises a first valve that selectively communicates coolant to at least one of the first heat sink and the second heat sink.

8. A method of operating a thermal management system for an electrified vehicle, the thermal management system comprising: an electrified powertrain comprising at least one electric drive module (EDM) having a first electric motor that generates a first drive torque; a battery system that powers the at least one EDM; a heating ventilation and air conditioning (HVAC) system; a first coolant loop associated with the at least one EDM; a second coolant loop associated with the battery system; a third coolant loop associated with the HVAC system; at least one valve that opens and closes to modify an amount of coolant being delivered between the first, second and third coolant loops; a first and a second temperature sensor that respectively measure temperature of coolant on opposite sides of the at least one EDM, the first and second temperature sensors providing temperature signals based on the measurements, the method comprising:

receiving, at a controller, the temperature signals;
approximating, at the controller, an estimator probability distribution based on developed estimators;
determining, at the controller, an optimal estimate of heat absorbed by the coolant that maximizes the probability distribution; and
communicating, at the controller, a signal to the at least one valve to modify an amount of coolant sent between the first coolant loop and at least one of the second and third coolant loops.

9. The method of claim 8, wherein the at least one EDM comprises a first EDM and a second EDM.

10. The method of claim 9, wherein the first EDM is configured on a front axle of the electrified vehicle and the second electric drive module is configured on a rear axle of the electrified vehicle.

11. The method of claim 8, wherein the controller approximates an estimator probability distribution based on developed estimators, wherein the developed estimators calculate a value using sensor fusion based on a mathematical model using the temperature signals of the second temperature sensors.

12. The method of claim 11, wherein the controller approximates an estimator probability distribution by expanding a series of Gaussian distributions.

13. The method of claim 12, wherein the series of Gaussian distributions include one of a Gaussian mixture models, Kernel density estimations, and Edgeworth series.

14. The method of claim 8, wherein the at least one valve comprises a first valve that selectively communicates coolant to at least one of the first heat sink and the second heat sink, wherein communicating the signal to the at least one valve comprises:
communicating a first signal to the first valve resulting in a modified flow of coolant from the first coolant loop to at least one of the second and third coolant loops.

\* \* \* \* \*